US012609733B2

(12) United States Patent
Åström et al.

(10) Patent No.: US 12,609,733 B2
(45) Date of Patent: Apr. 21, 2026

(54) ESTABLISHING A CONNECTION FOR WIRELESS COMMUNICATION

(71) Applicant: Telefonaktiebolaget LM Ericsson (publ), Stockholm (SE)

(72) Inventors: Magnus Åström, Lund (SE); Ashkan Kalantari, Malmö (SE); Saeed Bastani, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 154 days.

(21) Appl. No.: 18/686,244

(22) PCT Filed: Jun. 24, 2021

(86) PCT No.: PCT/EP2021/067441
§ 371 (c)(1),
(2) Date: Feb. 23, 2024

(87) PCT Pub. No.: WO2022/268332
PCT Pub. Date: Dec. 29, 2022

(65) Prior Publication Data
US 2024/0305336 A1     Sep. 12, 2024

(51) Int. Cl.
*H04B 7/04*          (2017.01)
(52) U.S. Cl.
CPC ................................ *H04B 7/04013* (2023.05)
(58) Field of Classification Search
CPC ........................... H04B 7/04013; H04B 7/024; H04B 7/15528; H04B 7/0617
See application file for complete search history.

(56) References Cited

U.S. PATENT DOCUMENTS

2020/0120458 A1     4/2020  Aldana et al.
2023/0078537 A1*    3/2023  Yerramalli ........... H04B 7/0639
                                                         370/329
2024/0154648 A1*    5/2024  Elshafie ............... H04B 7/0639

FOREIGN PATENT DOCUMENTS

CN          111245494 A      6/2020

OTHER PUBLICATIONS

International Search Report and Written Opinion of the International Searching Authority mailed Mar. 28, 2022 for International Application No. PCT/EP2021/067441, 12 pages.

* cited by examiner

*Primary Examiner* — Sung S Ahn
(74) *Attorney, Agent, or Firm* — Sage Patent Group

(57)          ABSTRACT

Methods and apparatus are provided. In an example aspect, a method performed by a first wireless communication device of establishing a connection for wireless communication is provided. The method includes receiving, on a first wireless communications channel, information about a reflective surface. The method also includes establishing, based on the information about the reflective surface, the connection for wireless communication with a second wireless communication device via the reflective surface on a second wireless communications channel, wherein the second wireless communications channel is different to the first wireless communications channel.

20 Claims, 3 Drawing Sheets

200

100

200

300

400

ESTABLISHING A CONNECTION FOR WIRELESS COMMUNICATION

CROSS-REFERENCE TO RELATED APPLICATIONS

This application is a 35 U.S.C. § 371 national stage application for International Application No. PCT/EP2021/067441, entitled "ESTABLISHING A CONNECTION FOR WIRELESS COMMUNICATION", filed on Jun. 24, 2021, the disclosures and contents of which are hereby incorporated by reference in their entireties.

TECHNICAL FIELD

Examples of the present disclosure relate to establishing a connection for wireless communication, such as for example via a reflective surface.

BACKGROUND

New approaches and methods may be employed in order to enhance capacity and system performance of a wireless communication system, such as the 5th Generation (5G) or New Radio (NR) wireless communication system. For instance, mmWaves (>100 GHz) are introduced in 5G-NR enabling GHz bandwidths and corresponding high bit rates. However, mm Waves are sensitive to blocking by objects. FIG. 1 shows an example of a wireless communication system 100, which includes a first base station 102, second base station 104 and User Equipment (UE) 106. The closest network node to the UE 106 is the first base station 102. However, the direct signal path 108 from the first base station 102 to the UE 106 is blocked by an object 110, which may be a building. Therefore, the UE 106 is connected to the second base station 104 where a Line of Sight (LoS) channel 112 exists between the second base station 104 and the UE 106. However, the second base station 104 is further away from the UE 106 than the first base station 106, and hence has a larger path loss. Furthermore, a possible non-line of sight path 114 (which reflects from another object 116) from the first base station 102 does not reach the UE 106, since the reflection does not reach the UE 106.

One technique that is considered to improve the coverage of base stations is to create smart radio environments. Instead of seeing the environment as passive elements, there are ongoing research projects to create surfaces that can interact with the radio environment. Such surfaces are called intelligent surfaces or meta-surfaces.

An electromagnetic meta-surface is a surface made of electromagnetic material that is engineered in order to exhibit properties that are not found in naturally occurring materials. An example of a meta-surface is, in practice, an electromagnetic discontinuity, which can be defined as a complex electromagnetic structure that is typically deeply sub-wavelength in thickness, is electrically large in transverse size, and is composed of sub-wavelength scattering particles with extremely small features. In simple terms, a meta-surface is made of a two-dimensional array of sub-wavelength metallic or dielectric scattering particles that transform the electromagnetic waves in different ways.

The major difference between a surface and a meta-surface lies in the capability of the latter to shape the radio waves according to the generalized Snell's laws of reflection and refraction. For example, the angles of incidence and reflection of the radio waves are not necessarily the same for a meta-surface. FIG. 1 shows an example of a wireless communication system 200 that includes the base stations 102 and 104, UE 106 and objects 110 and 116 from the communication system of FIG. 1. An intelligent surface (or meta-surface) 202 has been attached to the object 116, and the reflected radio wave 204 from the first base station now reach the UE 106.

SUMMARY

One aspect of the present disclosure provides a method performed by a first wireless communication device of establishing a connection for wireless communication. The method comprises receiving, on a first wireless communications channel, information about a reflective surface. The method also comprises establishing, based on the information about the reflective surface, the connection for wireless communication with a second wireless communication device via the reflective surface on a second wireless communications channel, wherein the second wireless communications channel is different to the first wireless communications channel.

Another aspect of the present disclosure provides a method performed by a network node of establishing a connection for wireless communication. The method comprises providing, to a first wireless communication device on a first wireless communications channel, information about a reflective surface. The method also comprises establishing the connection for wireless communication with the first wireless communication device via the reflective surface on a second wireless communications channel, wherein the second wireless communications channel is different to the first wireless communications channel.

A further aspect of the present disclosure provides an apparatus in a first wireless communication device for establishing a connection for wireless communication. The apparatus comprises a processor and a memory. The memory contains instructions executable by the processor such that the apparatus is operable to receive, on a first wireless communications channel, information about a reflective surface, and establish, based on the information about the reflective surface, the connection for wireless communication with a second wireless communication device via the reflective surface on a second wireless communications channel, wherein the second wireless communications channel is different to the first wireless communications channel.

A still further aspect of the present disclosure provides apparatus in a network node for establishing a connection for wireless communication. The apparatus comprises a processor and a memory. The memory contains instructions executable by the processor such that the apparatus is operable to provide, to a first wireless communication device on a first wireless communications channel, information about a reflective surface, and establish the connection for wireless communication with the first wireless communication device via the reflective surface on a second wireless communications channel, wherein the second wireless communications channel is different to the first wireless communications channel.

An additional aspect of the present disclosure provides apparatus in a first wireless communication device for establishing a connection for wireless communication. The apparatus is configured to receive, on a first wireless communications channel, information about a reflective surface, and establish, based on the information about the reflective surface, the connection for wireless communication with a second wireless communication via the reflective surface on a second wireless communications channel, wherein the second wireless communications channel is different to the first wireless communications channel.

Another aspect of the present disclosure provides apparatus in a network node for establishing a connection for wireless communication. The apparatus is configured to provide, to a first wireless communication device on a first wireless communications channel, information about a reflective surface, and establish the connection for wireless communication with the first wireless communication device via the reflective surface on a second wireless communications channel, wherein the second wireless communications channel is different to the first wireless communications channel.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
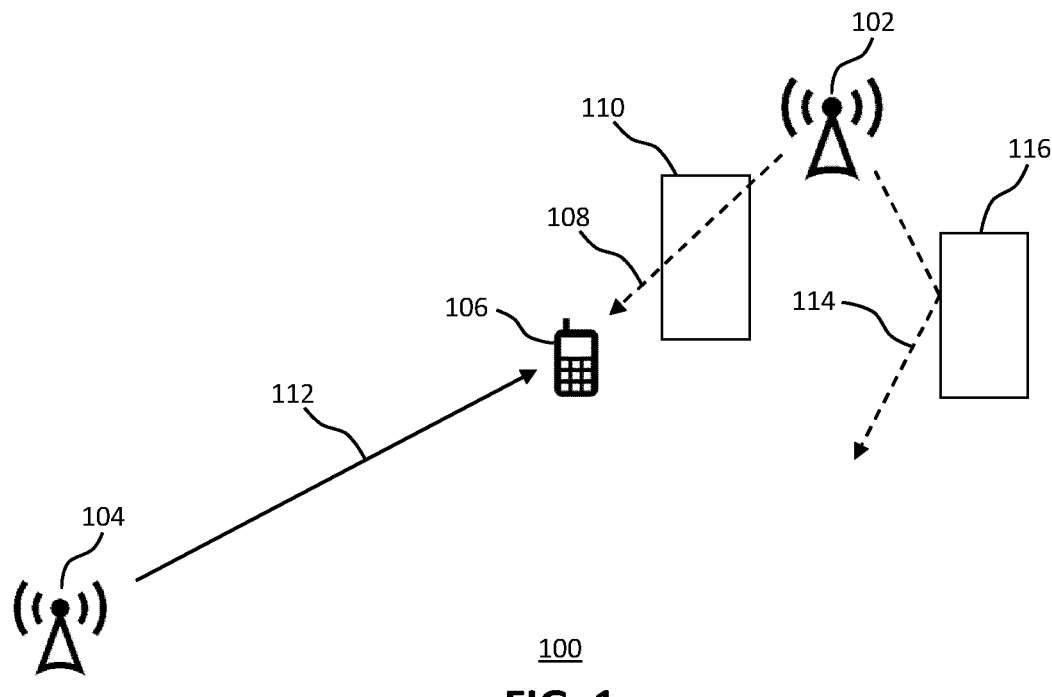
FIG. 1 shows an example of a wireless communication system.
Figure 2:
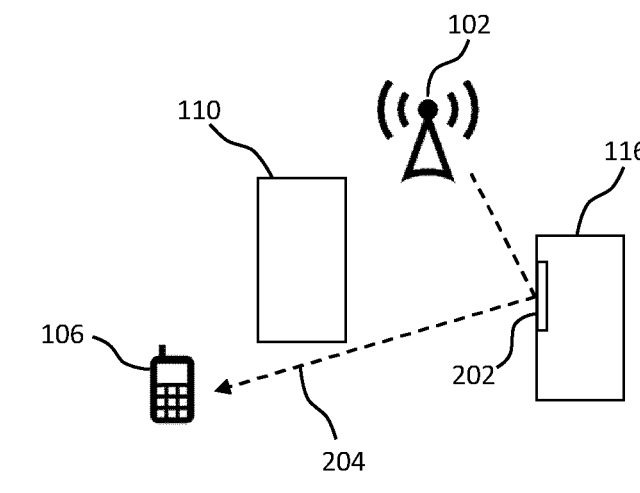
FIG. 2 shows another example of a wireless communication system.
Figure 2:

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Some wireless communications, such as for example millimeter-wave (mm Wave) communications, may be characterized by the LoS requirements of the wireless link. Intelligent reflective surfaces (IRSs) may be used to mitigate LoS requirements for mm Wave communications by using a surface to reflect a radio beam from an area with poor or nonexistent LoS connectivity towards a base station or the other way around. In other cases, IRSs may be used to enable a wireless communication device such as a UE to communicate with a particular base station.

Base stations (which may be examples of the second communication device referred to below) may attempt to achieve a sufficient range of the communications link, such as for example by using beamforming. The more antenna elements that are used in the transmitter or receiver, the narrower the beam and the farther the reach. However, the narrow beams also imply a larger search space in order to detect a link towards the base station. e.g. via an IRS, and more resources may need to be provided by the base station to provide reference signals for a searching UE. Hence, there is a need for a method to assist the UE in its search for an IRS such that the search complexity and duration may be reduced.

In order to control the reflections of the intelligent surface, there may be a communication channel between the network node (e.g. base station), which is an example of the second communication device referred to below, and the intelligent surface. This communication channel is typically wireless and may use cellular communication techniques (e.g. NR. LTE) using sub 6 GHz bands or higher bands, or may use Wi-Fi or other radio access technology used over unlicensed radio spectrum. However, in some examples it is assumed that the network node has a Line of Sight (LoS) to the surface. Hence, a sub-6 GHz band communication channel is not necessary to control the reflections of the intelligent surface.

Examples of this disclosure may provide for example method to provide information about a reflective surface (e.g. an IRS or meta-surface) to a first wireless communications device (e.g. a UE) in a wireless network. The surface is assumed to be associated with (at least) one other wireless communications device, such as a base station, with which the first device will attempt to establish a connection. The first device is assumed to obtain the information on a first wireless communications channel, such as for example a first carrier, frequency, band or beam, while the surface operates on a second channel that is different to the first channel (e.g. uses a different carrier, frequency or beam). In an example, a method first identifies at least one reflective surface for which the information will be provided. Second, the information to be provided to the first device is determined. Finally, the provided information is transmitted to the first device on the second channel (e.g. from the second device). Herein, a reflective surface may for example comprise a surface that reflects a substantial portion of a radio signal at a frequency of interest, or in a frequency range or band of interest. The first wireless communication device may then establish a connection for wireless communication via the reflective surface with a second wireless communication device, which may be a base station for example.

In some examples, Frequency Range 2 (FR2) will provide extreme throughputs at locations where FR2 provides coverage. These locations will oftentimes be limited to line-of-sight (LoS) locations in relation to the base station. At other locations, FR2 will be less able to provide high throughput. A reflective surface such as an IRS or meta-surface may mitigate some of the coverage limitations of FR2 in that it may provide FR2 coverage also in non-line-of-sight (nLoS) locations from the second wireless communication device (e.g. base station). However, in order to communicate with a second wireless device via a reflective surface, it may be advantageous that a first wireless communication device is provided information about the reflective surface such that it may effectively establish a communications channel via the reflective surface. This may allow wireless communication devices to know the properties of and thereby use the reflective surface without having established a connection to or via it (and thereby the FR2 network for example). Thereby, for example, it is possible to drastically reduce the search effort for a first wireless communication device in detecting the reflective surface or otherwise establishing a connection for wireless communication with a second device via the surface.

Examples of this disclosure include methods to provide information about a reflective surface such as an IRS to a wireless device (e.g. a UE) in a wireless network. By obtaining this information, the UE may in some examples access a carrier (e.g. on Frequency Range 2, FR2) more quickly and more efficiently than what otherwise would be the case. Since FR2 is unlikely to be used for coverage but instead data off loading, being able to rapidly establish a connection may be a key performance indicator. The reflective surface is in some examples assumed to be associated with a second wireless communication device or network node (e.g. base station) with which the first wireless device (e.g. UE) will attempt to establish a connection. Due to the nature of the spectrum on which the surface typically operates (e.g. LoS is required) in some examples, the UE is assumed to obtain the information on a first channel while the surface operates on a second channel. However, the LoS requirement also makes the radio channel more predictable in that the typical rich radio channel is replaced by a sparse point-to-point beamed channel. Therefore, the physical properties of the wireless communication devices and reflective surface are more predictable. e.g. the beam that should be used is more closely related to the physical direction towards the reflective surface. In some examples, in combination with an inertial motion unit (IMU) sensor, it may be further possible to reduce the search space in that the UE may establish a relation between the physical directions and beam directions. A typical FR1 signal path, for example, has no strong relation between physical directions and the optimal channel to the base station, whereas there may be such a relation for FR2, either directly or indirectly via a reflective surface such as an IRS. The base station (or second wireless communication device or network node) can learn about the reflective surface in different ways. For example, the surface may be of a reconfigurable type, in which case the surface is assumed to be provided with a wireless controller, similar to a UE. If the surface is of a non-configurable type, the base station may have knowledge of the surface from a configuration file, where also the properties of the reflective surface may be provided in some examples.

Figure 3:
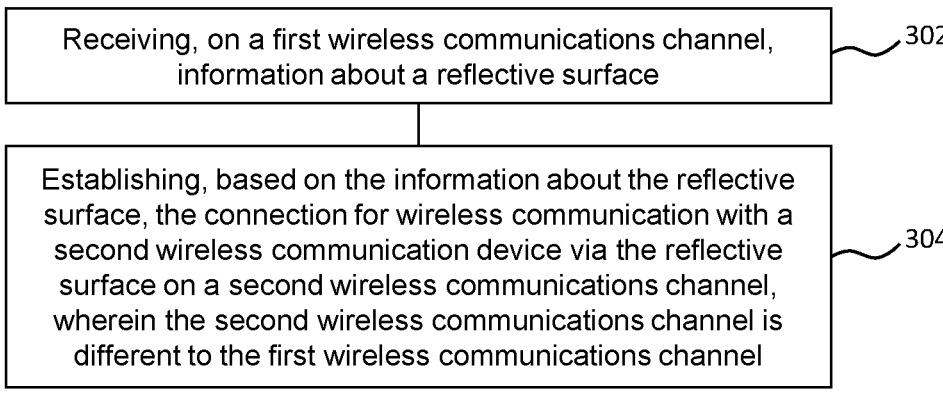
FIG. 3 is a flow chart of an example of a method performed by a first wireless communication device of establishing a connection for wireless communication.

FIG. 3 is a flow chart of an example of a method 300 performed by a first wireless communication device of establishing a connection for wireless communication. The first wireless communication device may be for example a terminal device or User Equipment (UE). The method comprises, in step 302, receiving, on a first wireless communications channel, information about a reflective surface, such as for example an IRS, meta-surface, reconfigurable reflective surface or reconfigurable intelligent surface. In some examples, the reflective surface may be a passive or non-reconfigurable surface (which may be a meta-surface). The method 300 also comprises, in step 304, establishing, based on the information about the reflective surface, the connection for wireless communication with a second wireless communication device via the reflective surface on a second wireless communications channel. The second wireless communications device may be for example a base station, base station control unit (CU) or base station distributed unit (DU).

The second wireless communications channel is different to the first wireless communications channel. That is, for example, the second wireless communications channel may be on a different carrier, beam, band or frequency. Additionally or alternatively, the second wireless communications channel may be a channel to a device other than the second wireless communication device in some examples. The first wireless communications channel may in some examples use a first carrier in a first frequency range and the second wireless communications channel may use a second carrier in a second frequency range higher than the first frequency range. For example, the first frequency range comprises Frequency Range 1 (FR1) and the second frequency range comprises Frequency Range 2 (FR2).

Establishing a connection for wireless communication with the second wireless communication device via the reflective surface on the second wireless communications channel may in some examples comprise performing random access on the second wireless communications channel.

Thus for example the first wireless communication device may receive the information relating to the reflective surface on a channel that is different to the one that will be used to establish a communication channel with the second wireless communication device. As a result, in some examples, any searching for a channel for communicating with the second wireless communication device may be reduced in scope or eliminated.

In some examples, the method 300 may comprise determining a direction of the reflective surface from the first wireless communication device. This may comprise for example, determining the direction based on the location of the reflective surface and at least one of a location and orientation of the first wireless communication device, particularly for example where the information about the reflective surface indicates the location of the reflective surface. Alternatively, for example, the direction of the reflective surface may be determined from the information, wherein the information includes the direction of the reflective surface from the first wireless communication device. In some examples, where the first device obtains information relating to the location of the device, this may be retrieved from e.g. a GPS sensor in the device, whereas orientation information, where used, may be obtained from an inertial motion unit (IMU).

In some examples, therefore, establishing, based on the information about the reflective surface, the connection for wireless communication with the second wireless communication device via the reflective surface may comprise establishing the connection based further on the direction of the reflective surface from the first wireless communication device. Establishing the connection based further on the direction of the reflective surface from the first wireless communication device may in some examples comprise using, for communication with the second wireless communication device via the reflective surface on the second wireless communications channel, one or more beams (e.g. those that propagate substantially in the direction of the reflective surface from the first wireless communication device) based on the direction of the reflective surface from the first wireless communication device. Additionally or alternatively, for example, establishing the connection based further on the direction of the reflective surface from the first wireless communication device may comprise using, for communication with the second wireless communication device via the reflective surface on the second wireless communications channel, one or more antenna panels from a plurality of antenna panels based on the direction of the reflective surface from the first wireless communication device. As a result of one or more of these features, the search space of the first wireless communication device to find a channel for communication with the second wireless communication device may in some examples be reduced in scope or eliminated.

In some examples, the information includes at least one of the following: a cell ID of a cell associated with the second wireless communications channel; a location and/or orientation of the first wireless communication device; an indication of whether the reflective surface is reconfigurable; one or more frequency bands that are reflected by the reflective surface; reflection angle properties of the reflective surface; switching properties of the reflective surface; an indication of whether the reflective surface can reflect wireless communications for uplink and/or downlink; an attenuation factor of the reflective surface; beamforming properties of the reflective surface; a shape of the reflective surface; and a scheduling grant for establishing the connection for wireless communication with the second wireless communication device via the reflective surface on the second wireless communications channel. At least some of these properties may facilitate the first wireless communication device to establish the connection with the second wireless communication device. For example, at least some of these properties may allow the first wireless communication device to reduce its search space when searching for the wireless communication devices (e.g. including the second wireless communication devices) on one or more communication channels (e.g. one or more antennas, antenna panels, frequencies, beams, bands and/or carriers).

The information may be received for example on the first channel in one or more system information (SI) messages, one or more Radio Resource Control (RRC) messages and/or one or more Medium Access Control, MAC, Control Elements, CEs (e.g. in one or more other messages, such as RRC or SI messages and/or other messages). The information may be received from the second wireless communication device or some other network node.

In some examples, the first wireless communications channel is associated with a first cell, and the second wireless communications channel is associated with a second cell. The first and second cells may in some examples be associated with different base stations, and in such cases the information may be received from the base station associated with the first cell. Alternatively, for example, the first and second cells are associated with the same base station, and the information may therefore be received from that base station. In some examples, establishing, based on the information about the reflective surface, the connection for wireless communication with the second wireless communication device via the reflective surface comprises establishing a connection to the second cell.

The first wireless communications channel may in some examples use a first carrier in a first frequency range and the second wireless communications channel may use a second carrier in a second frequency range higher than the first frequency range. For example, the first frequency range comprises Frequency Range 1 (FR1) and the second frequency range comprises Frequency Range 2 (FR2).

In a specific example, a first wireless communication device such as a UE may receive information about a reflective surface on a first channel (e.g. from a second wireless communication device, though this may be received from another device or node) and then connect to the network via the cell to which the surface is associated (either to same device or a different device to the device from which the information was received), by utilizing the received information. For example, in a first step, the first wireless communication device receives information on a first carrier about at least one IRS by either a SI and/or an RRC message. In a second step, the first wireless communication device determines its own orientation (e.g. from IMU) and location (e.g. from GPS sensor). With the location information of both itself and the reflective surface, the first wireless communication device can, in a third step, determine an uplink/downlink direction to the IRS, and by knowing its orientation and its own physical antenna configuration (e.g. in what direction from the first wireless communication device the antenna elements are directed), in a fourth step, the first wireless communication device can construct a beam or a set of beams in the direction of the reflective surface, or select an appropriate antenna panel e.g. that will propagate a signal or beam substantially in the direction of the reflective surface. Finally, the first wireless communication device attempts to communicate, via the reflective surface, with the cell with which the reflective surface is associated and by using the constructed beam or set of beams. Determining the direction of the reflective surface may for example include determining a preferred reflective surface, e.g., based on selecting the reflective surface with the shortest distance from the first wireless communication device, estimated highest signal power level at the first wireless communication device location, or an IRS that operates on a suitable spectrum band, directivity or suitable reflection angles, or a combination thereof, and then determining the direction to the selected reflective surface.

Figure 4:
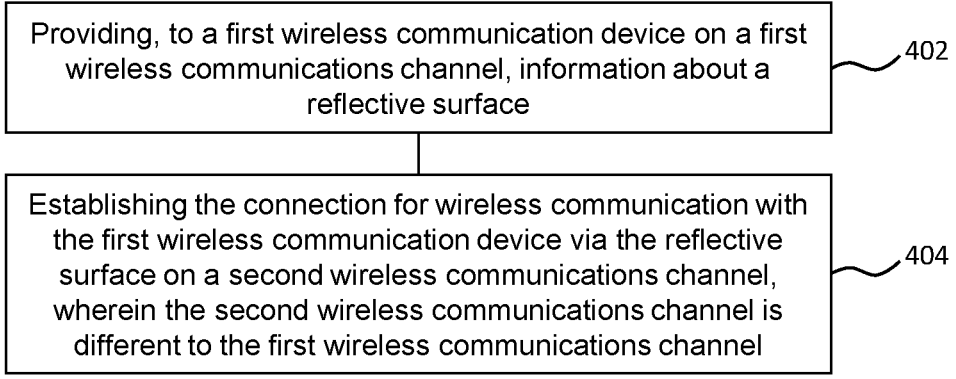
FIG. 4 is a flow chart of an example of a method performed by a network node of establishing a connection for wireless communication.

FIG. 4 is a flow chart of an example of a method 400 performed by a network node of establishing a connection for wireless communication. The network node may be for example a base station, base station control unit (CU) or base station distributed unit (DU). In some examples, the network node may be a second wireless communication device as referred to above. The method 400 comprises, in step 402, providing, to a first wireless communication device on a first wireless communications channel, information about a reflective surface. The first wireless communications device may be a UE for example. The method 400 also comprises, in step 404, establishing the connection for wireless communication with the first wireless communication device via the reflective surface on a second wireless communications channel, wherein the second wireless communications channel is different to the first wireless communications channel. In some examples, the network node corresponds to the second wireless communication device referred to above in relation to the method 300 of FIG. 3. Thus, in some examples, the first wireless communications device referred to in the method 400 may correspond to the first wireless communications device referred to in the method 300. The reflective surface may be for example a meta-surface, reconfigurable reflective surface, reconfigurable intelligent surface or Intelligent Reflective Surface (IRS).

Thus for example the first wireless communication device may receive the information relating to the reflective surface on a channel that is different to the one that will be used to establish a communication channel with the network node. As a result, in some examples, any searching for a channel for communicating with the network node may be reduced in scope or eliminated.

In some examples, establishing the connection may involve receiving a random access request on the second wireless communications channel from the first wireless communications device. Establishing the connection may also involve providing the appropriate random access response on the second wireless communications channel, and also in some examples performing subsequent steps to complete a random access procedure.

The information may in some examples include at least one of the following: a location of the reflective surface; a cell ID of a cell associated with the second wireless communications channel; a location and/or orientation of the first wireless communication device; an indication of whether the reflective surface is reconfigurable; one or more frequency bands that are reflected by the reflective surface; reflection angle properties of the reflective surface; switching properties of the reflective surface; an indication of whether the reflective surface can reflect wireless communications for uplink and/or downlink; an attenuation factor of the reflective surface; beamforming properties of the reflective surface; a shape of the reflective surface; and a scheduling grant for establishing the connection for wireless communication with the base station via the reflective surface on the second wireless communications channel. At least some of these properties may facilitate the first wireless communication device to establish the connection with the network node. For example, at least some of these properties may allow the first wireless communication device to reduce its search space when searching for the network node on one or more communication channels (e.g. one or more antennas, antenna panels, frequencies, beams, bands and/or carriers).

The information may be sent to the first wireless communication device for example in one or more system information (SI) messages, one or more Radio Resource Control (RRC) messages and/or one or more Medium Access Control, MAC, Control Elements, CEs (which may be included in one or more messages to the first wireless communication device).

In some examples, the first wireless communications channel is associated with a first cell, and the second wireless communications channel is associated with a second cell. Establishing, based on the information about the reflective surface, the connection for wireless communication with the first wireless communication device via the reflective surface may in some examples comprise establishing a connection to the first wireless communication device via the second cell. The first wireless communications channel may use a first carrier in a first frequency range (e.g. FR1) and the second wireless communications channel may use a second carrier in a second frequency range (e.g. FR2) higher than the first frequency range for example.

In a specific example, a network node such as a base station or CU first identifies at least one reflective surface for which information will be provided. Second, the information to be provided is determined. Third, the determined information is transmitted in the first wireless communications channel. The assumption for at least some examples of this disclosure is that the first channel or carrier is not constrained to LoS communications, whereas the second channel or carrier may be.

The kind of information that may be provided about a reflective surface may in some examples be used by a first wireless communication device (e.g. a UE) primarily for assisting in establishing a communications channel or link via a reflective surface to another wireless communications device such as a base station. In addition to the examples provided above, the following provides a list of information, one or more of which may be included in the information, although this list may not be exhaustive.

Cell ID of the cell to which IRS is associated, or a cell served by the second wireless communication device.

Location and orientation of reflective surface—in order to construct a beam in the direction of the surface using UE location information from, e.g., GPS or by using a wireless technology for positioning, e.g., 6G, NR, Wi-Fi or Bluetooth.

Type, e.g., reconfigurable or non-configurable surface, since the different types of surface may result in different actions from the first wireless communications device. For example, if a non-configurable surface is used, the inclination angle must be suitable for the beam to be reflected sufficiently well or in the correct direction.

Operating spectrum band(s) and carrier aggregation (CA) properties, to enable the first wireless communication device to use the correct band(s) with a suitable reflective surface.

Fixed reflection angle, set of reflection angles or range of reflection angles, such that the UE can determine if its location is compatible with the reflective surface. If the surface modifies the phase of the incident wave, a wideband carrier may have more than one reflection angle since the phase shift changes with the frequency, which is called "beam tilting". Hence, the surface may cover different areas with different parts of the spectrum. The network can use the location of wireless communications devices and the directions of the tilted/ reflected beam to allocate bandwidths to the devices such that the tilted/reflected beams point in the direction of the appropriate devices. Thus, for example, examples of this disclosure may establish a connection for wireless communication with a wireless communication device (e.g. a first wireless communications device such as a UE, or a second wireless communications channel such as a base station or network node) via the reflective surface on a second wireless communications channel by using (or allocating) one or more bandwidths for the connection for wireless communication such that a signal between the network node and the second wireless communication device reflects from the reflective surface towards the first or second wireless communication device.

Switching pattern, so that the first wireless communications device knows the right time to transmit or receive via the reflective surface. For example, the reflective surface may be reconfigurable and may only be configured to reflect a signal between the first and second wireless communication devices at the correct angle at certain times according to the switching pattern.

Reciprocity, i.e., if the surface can be used both for uplink and downlink communications.

Attenuation factor of the surface, so that the first wireless communications device can determine whether it is within range or not and/or the first wireless communications device can perform suitable power control. In some examples, the attenuation of the reflective surface may be configurable. For example, an FPGA can control the resistors inside the reflective surface (e.g. IRS) to adjust the attenuation.

Power level of a reflected signal at surface (or at a reference point in relation to surface, say 1 m away), for the first wireless communications device to determine whether the surface or the second wireless communications device may be within range or not.

Beamforming capabilities-convex, flat or concave, giving an indication of the surface capabilities and assess throughput potential.

Scheduling grant for establishing a link to or accessing the network via the IRS.

As suggested above, in some examples, the information about the reflective surface may be provided in a system information (SI) message. In other examples, the information is provided in a dedicated RRC message. In yet further examples, the information may be divided such that some information is transmitted in an SI message and other information, e.g., a scheduling grant for either establishing a link or for transmitting data through the surface, is transmitted in a dedicated RRC message. In some examples, the cell to which the reflective surface is associated may transmit or (attempts to) receive a signal to/from a first wireless communications device via the surface according to the configuration that is provided by the second wireless communications device, e.g. base station. Such a signal may be an SSB, CSI-RS or DMRS transmission, an SRS reception or similar.

Figure 5:
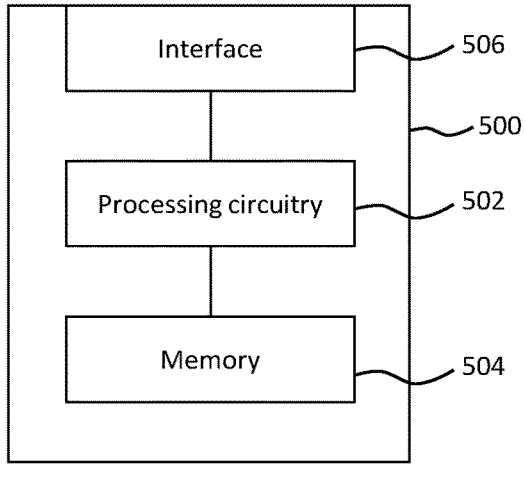
FIG. 5 is a schematic of an example of an apparatus in a first wireless communication device for establishing a connection for wireless communication.

FIG. 5 is a schematic of an example of an apparatus 500 in a first wireless communication device for establishing a connection for wireless communication. The apparatus 500 comprises processing circuitry 502 (e.g. one or more processors) and a memory 504 in communication with the processing circuitry 502. The memory 504 contains instructions executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable to receive, on a first wireless communications channel, information about a reflective surface, and establish, based on the information about the reflective surface, the connection for wireless communication with a second wireless communication device via the reflective surface on a second wireless communications channel, wherein the second wireless communications channel is different to the first wireless communications channel. In some examples, the apparatus 500 is operable to carry out the method 300 described above with reference to FIG. 3.

Figure 6:
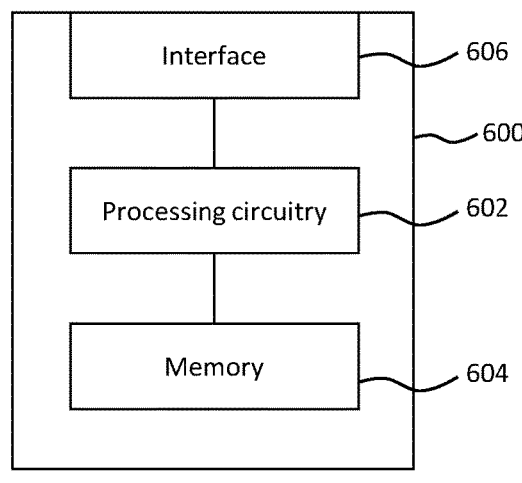
FIG. 6 is a schematic of an example of an apparatus in a network node for establishing a connection for wireless communication.

FIG. 6 is a schematic of an example of an apparatus 600 in a network node for establishing a connection for wireless communication. The apparatus 600 comprises processing circuitry 602 (e.g. one or more processors) and a memory 604 in communication with the processing circuitry 602. The memory 604 contains instructions executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable to provide, to a first wireless communication device on a first wireless communications channel, information about a reflective surface, and establish the connection for wireless communication with the first wireless communication device via the reflective surface on a second wireless communications channel, wherein the second wireless communications channel is different to the first wireless communications channel. In some examples, the apparatus 600 is operable to carry out the method 400 described above with reference to FIG. 4.

Figure 7:
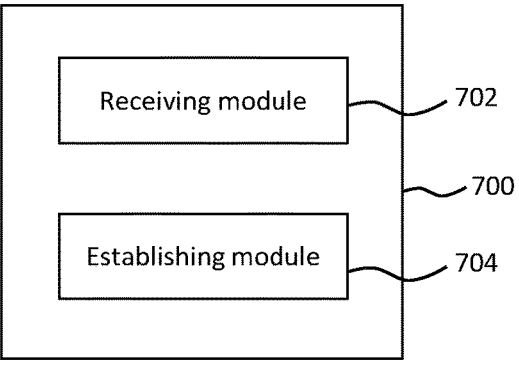
FIG. 7 is a schematic of another example of an apparatus in a first wireless communication device for establishing a connection for wireless communication.

FIG. 7 is a schematic of another example of an apparatus 700 in a first wireless communication device for establishing a connection for wireless communication. The apparatus 700 comprises a receiving module 702 configured to receive, on a first wireless communications channel, information about a reflective surface. The apparatus 700 also comprises an establishing module 704 configured to establish, based on the information about the reflective surface, the connection for wireless communication with a second wireless communication via the reflective surface on a second wireless communications channel, wherein the second wireless communications channel is different to the first wireless communications channel.

Figure 8:
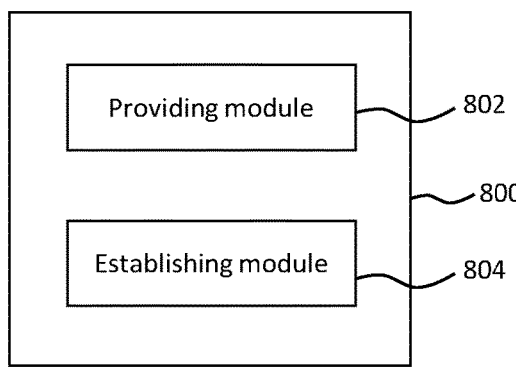
FIG. 8 is a schematic of another example of an apparatus in a network node for establishing a connection for wireless communication.

FIG. 8 is a schematic of another example of an apparatus 800 in a network node for establishing a connection for wireless communication. The apparatus 800 comprises a providing module 802 configured to provide, to a first wireless communication device on a first wireless communications channel, information about a reflective surface. The apparatus 800 also comprises an establishing module 804 configured to establish the connection for wireless communication with the first wireless communication device via the reflective surface on a second wireless communications channel, wherein the second wireless communications channel is different to the first wireless communications channel.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method performed by a first wireless communication device of establishing a connection for wireless communication, the method comprising:

receiving, on a first wireless communications channel, information about a reflective surface; and establishing, based on the information about the reflective surface, the connection for wireless communication with a second wireless communication device via the reflective surface on a second wireless communications channel, wherein the second wireless communications channel is different to the first wireless communications channel.

2. The method of claim 1, comprising determining a direction of the reflective surface from the first wireless communication device, and wherein establishing, based on the information about the reflective surface, the connection for wireless communication with the second wireless communication device via the reflective surface comprises establishing the connection based further on the direction of the reflective surface from the first wireless communication device.

3. The method of claim 2, wherein the information includes a location of the reflective surface, and wherein determining the direction of the reflective surface from the first wireless communication device comprises determining the direction based on the location of the reflective surface and at least one of a location and orientation of the first wireless communication device.

4. The method of claim 2, comprising determining the direction of the reflective surface from the information, wherein the information includes the direction of the reflective surface from the first wireless communication device.

5. The method of claim 2, wherein establishing the connection based further on the direction of the reflective surface from the first wireless communication device comprises using, for communication with the second wireless communication device via the reflective surface on the second wireless communications channel, one or more beams based on the direction of the reflective surface from the first wireless communication device.

6. The method of claim 5, wherein using one or more beams comprises using one or more beams that propagate substantially in the direction of the reflective surface from the first wireless communication device.

7. The method of claim 2, wherein establishing the connection based further on the direction of the reflective surface from the first wireless communication device comprises using, for communication with the second wireless communication device via the reflective surface on the second wireless communications channel, one or more antenna panels from a plurality of antenna panels based on the direction of the reflective surface from the first wireless communication device.

8. The method of claim 1, wherein the information includes at least one of:

a cell ID of a cell associated with the second wireless communications channel;

a location and/or orientation of the first wireless communication device;

an indication of whether the reflective surface is reconfigurable;

one or more frequency bands that are reflected by the reflective surface;

reflection angle properties of the reflective surface;

switching properties of the reflective surface;

an indication of whether the reflective surface can reflect wireless communications for uplink and/or downlink;

an attenuation factor of the reflective surface;

beamforming properties of the reflective surface;

a shape of the reflective surface; and a scheduling grant for establishing the connection for wireless communication with the second wireless communication device via the reflective surface on the second wireless communications channel.

9. The method of claim 8, wherein the information includes reflection angle properties of the reflective surface, and establishing, based on the information about the reflective surface, the connection for wireless communication with the second wireless communication device via the reflective surface comprises using one or more bandwidths for the connection for wireless communication such that a signal between the first wireless communication device and the second wireless communication device reflects from the reflective surface towards the first or second wireless communication device.

10. The method of claim 1, wherein the information is received in one or more system information (SI) messages, one or more Radio Resource Control (RRC) messages and/or one or more Medium Access Control (MAC) Control Elements (CEs).

11. The method of claim 1, wherein the first wireless communications channel is associated with a first cell, and the second wireless communications channel is associated with a second cell, wherein the first and second cells are associated with different base stations, wherein the information is received from the base station associated with the first cell, wherein the first and second cells are associated with the same base station, and wherein the information is received from the base station.

12. The method of claim 11, wherein establishing, based on the information about the reflective surface, the connection for wireless communication with the second wireless communication device via the reflective surface comprises establishing a connection to the second cell.

13. The method of claim 1, wherein the first wireless communications channel uses a first carrier in a first frequency range and the second wireless communications channel uses a second carrier in a second frequency range higher than the first frequency range.

14. The method of claim 1, wherein establishing, based on the information about the reflective surface, the connection for wireless communication with the second wireless communication device via the reflective surface comprises performing random access using the second wireless communications channel.

15. A method performed by a network node of establishing a connection for wireless communication, the method comprising:

providing, to a first wireless communication device on a first wireless communications channel, information about a reflective surface; and establishing the connection for wireless communication with the first wireless communication device via the reflective surface on a second wireless communications channel, wherein the second wireless communications channel is different to the first wireless communications channel.

16. The method of claim 15, wherein the information includes at least one of:

a location of the reflective surface;

a cell ID of a cell associated with the second wireless communications channel;

a location and/or orientation of the first wireless communication device;

an indication of whether the reflective surface is reconfigurable;

one or more frequency bands that are reflected by the reflective surface;

reflection angle properties of the reflective surface;

switching properties of the reflective surface;

15

16 an indication of whether the reflective surface can reflect wireless communications for uplink and/or downlink;

an attenuation factor of the reflective surface;

beamforming properties of the reflective surface;

a shape of the reflective surface; and a scheduling grant for establishing the connection for wireless communication with a base station via the reflective surface on the second wireless communications channel.

17. The method of claim 15, wherein establishing the connection for wireless communication with the first wireless communication device via the reflective surface on a second wireless communications channel comprises using one or more bandwidths for the connection for wireless communication such that a signal between the network node and a second wireless communication device reflects from the reflective surface towards the first or second wireless communication device.

18. The method of claim 15, wherein the information is sent to the first wireless communication device in one or more system information (SI) messages, one or more Radio Resource Control (RRC) messages and/or one or more Medium Access Control (MAC) Control Elements (CEs).

19. The method of claim 15, wherein the first wireless communications channel is associated with a first cell, and the second wireless communications channel is associated with a second cell, and wherein the first wireless communications channel uses a first carrier in a first frequency range and the second wireless communications channel uses a second carrier in a second frequency range higher than the first frequency range.

20. The method of claim 19, wherein establishing, based on the information about the reflective surface, the connection for wireless communication with the first wireless communication device via the reflective surface comprises establishing a connection to the first wireless communication device via the second cell and wherein establishing, based on the information about the reflective surface, the connection for wireless communication with the first wireless communication device via the reflective surface comprises receiving a random access request on the second wireless communications channel.

* * * * *